United States Patent
Sotozaki (10) Patent No.: US 11,537,962 B2
(45) Date of Patent: Dec. 27, 2022

(54) RESOURCE PLANNING METHOD AND SYSTEM

(71) Applicant: MXI TECHNOLOGIES LTD., Ottawa (CA)

(72) Inventor: Yui Sotozaki, Ottawa (CA)

(73) Assignee: MXI TECHNOLOGIES LTD, Ottawa (CA)

( * ) Notice: Subject to any disclaimer, the term of this patent is extended or adjusted under 35 U.S.C. 154(b) by 478 days.

(21) Appl. No.: 14/658,477

(22) Filed: Mar. 16, 2015

(65) Prior Publication Data
US 2015/0262104 A1 Sep. 17, 2015

Related U.S. Application Data

(60) Provisional application No. 62/033,351, filed on Aug. 5, 2014.

(51) Int. Cl.
*G06Q 10/06* (2012.01)

(52) U.S. Cl.
CPC ............... *G06Q 10/06313* (2013.01)

(58) Field of Classification Search
CPC combination set(s) only.
See application file for complete search history.

(56) References Cited

U.S. PATENT DOCUMENTS

| | | | | |
|---|---|---|---|---|
| 4,937,743 A * | 6/1990 | Rassman | ................. | G06Q 10/06 705/7.22 |
| 6,415,259 B1 * | 7/2002 | Wolfinger | ........ | G06Q 10/06311 705/7.13 |
| 7,058,587 B1 * | 6/2006 | Horne | .................... | G06Q 10/06 705/7.22 |
| 7,457,762 B2 * | 11/2008 | Wetzer | ................... | G06Q 10/06 705/7.25 |
| 7,502,747 B1 * | 3/2009 | Pardo | ..................... | G06Q 10/06 705/7.13 |
| 8,296,197 B2 * | 10/2012 | Avery | .................... | G06Q 10/06 701/123 |
| 8,725,547 B2 * | 5/2014 | Fuhrmann | .............. | G06Q 10/06 705/7.15 |
| 9,189,824 B2 * | 11/2015 | Nixon | .................... | G06Q 50/30 |
| 9,378,471 B2 * | 6/2016 | Pachon | ............ | G06Q 10/06312 |
| 2004/0117046 A1 * | 6/2004 | Colle | .................. | G06Q 10/109 700/99 |
| 2004/0138938 A1 * | 7/2004 | Quintus | ................. | G06Q 10/06 705/7.25 |

(Continued)

*Primary Examiner* — Mehmet Yesildag
(74) *Attorney, Agent, or Firm* — Grossman, Tucker, Perreault & Pfleger, PLLC (57) ABSTRACT

The invention is generally related to operations support systems and more specifically, to a method of and system for managing and planning future use of resources. One embodiment of the invention comprises an operations support system which displays multiple visits across a timeline, each visits being associated with a set of resource requirements. The system tabulates, in real-time, the total level of resources required for all of the visits, for each given day, comparing these totals against nominal available resource levels. If there is a shortfall, the system displays a number associated with the short-fall, such as the number of additional technicians that would be required. This provides the user with feedback so he/she can amend visits and tasks within visits to resolve short-falls in resources.

22 Claims, 10 Drawing Sheets

(56) References Cited

U.S. PATENT DOCUMENTS

| | | | | |
|---|---|---|---|---|
| 2005/0015504 A1* | 1/2005 | Dome | ............... | G06Q 10/04 |
| | | | | 709/229 |
| 2008/0215414 A1* | 9/2008 | Fehnel | ............... | G06Q 10/0631 |
| | | | | 705/7.16 |
| 2009/0125368 A1* | 5/2009 | Vujicic | ............... | G06Q 10/00 |
| | | | | 705/7.13 |
| 2013/0103444 A1* | 4/2013 | Agarwal | ............... | G06Q 10/06312 |
| | | | | 705/7.14 |
| 2014/0081697 A1* | 3/2014 | McElroy | ............... | G05B 19/41865 |
| | | | | 705/7.21 |
| 2015/0193722 A1* | 7/2015 | Seaman | ............... | G06Q 10/109 |
| | | | | 705/7.15 |
| 2015/0286979 A1* | 10/2015 | Ming | ............... | G06Q 10/06311 |
| | | | | 705/7.14 |

* cited by examiner

RESOURCE PLANNING METHOD AND SYSTEM

FIELD OF INVENTION

The invention is generally related to operations support systems and more specifically, to a method of and system for managing and planning future use of resources.

BACKGROUND OF THE INVENTION

Operations support systems exist to provide efficient monitoring and support of line, heavy, shop maintenance, engineering, materials management, finance and other aspects of aviation and other fields. However, existing operations support systems do not provide effective ways of planning for future use of multiple resources. As a result, they are not helpful, for example, when companies are attempting to bid on future work or manage their future commitments.

There is therefore a need for an improved method of and system for providing operations support.

SUMMARY OF THE INVENTION

Airframe repair stations are in the business of selling labour, which in turn means selling 'tracks' or 'slots' of time in hangars to their customers. Keeping track of what has been tentatively booked (i.e. quoted) versus confirmed work, along with hangar capability and capacity, gets more difficult as the company grows.

At an MRO (maintenance, repair and operations) organization, the Sales team may review the contracted and quoted work planned in their maintenance locations. When booking new business they will look to find available timeslots at locations that have the capability and capacity to perform the work. They have to take into account the multitude of factors that affect such plans, for example: human resources availability, location capabilities and availability, long term contracts, etc. The goals are to keep the hangars full, identify maintenance window opportunities, and ensure that they are not overbooked. The system and method described hereinafter, sets out ways of managing such resources.

The system described gives up-to-date information needed for making crucial day-to-day strategic decisions in an operations support environment. The system is preferably structured to provide hangar utilization and planned projects to be viewed out 1 to 2 years, though of course any window of time could be used. Work is often only contracted/quoted about 3 to 6 months ahead of time, and about 10 tracks will be necessary for a large $3^{rd}$ party MRO. Thus, 1000 tracked visits is likely sufficient for most applications.

In order to respond to quotes or queries from potential customers on when they could bring their aircraft in for maintenance it is necessary to know what projects are tentatively booked (i.e. awaiting contract) and where contracted work is in place. It is quite common for an organization to have a number of Salespersons or Planners booking work. Hence, the system provides a centralized, real-time management system to accommodate this.

Long range planners schedule maintenance activities across a number of tracks, with potentially multiple hangar locations. Thus, the system takes into account the capabilities of each location, and the capacity of each location. The capacity of a location may fluctuate over the course of a week, over the course of a season, over the course of a 2-year plan. The system also allows the user to apply a business preference or priority model for their locations. For example, the system allows a user to define a slot or track as usually handling wide-bodied aircraft, although it could alternatively hold two narrow-bodied aircraft. The system of the invention does not make any decisions on the basis of such priorities, rather, it provides the user with the capacity to identify a track in a particular way. The user can easily change the track if he/she wishes to.

Again, in order to respond to quotes or queries from potential customers on when they could bring their aircraft in for maintenance the system indicates where projects are tentatively booked (i.e. awaiting contract) and where contracted work is in place. Assuming there is a timeslot available in the window being asked for by the customer, the system allows us to verify that the hangar track has the capability to work on this type of aircraft, and the physical space to squeeze another aircraft on to this track. That is, a track may fit one wide-body aircraft (e.g. B777 is 6.2 m in diameter, 65 m wingspan) or two narrow-body (e.g. B737 is 3.8 m in diameter, 35 m wingspan). As explained in greater detail hereinafter, there is no complexity in providing this flexibility as the system itself does not perform any processing or decision-making in this regard. Rather, the system provides the functionality and flexibility for the user to make such distinctions and specifications.

One needs to look at resourcing to make sure you have the skilled labour available and a project manager to manage a given project. That is, one must be able to answer the question: do I have the capacity to do the work, looking at nominal resource types across my hangar or hangars? Thus, the system provides the means to look down to the skill level. The system does this by treating all resources in the same quantified way, regardless of whether they are related to labour, equipment or other resources. In this way, all of the resource needs can be measured and accounted for in the planning/scheduling of work. Also, in the interest of simplicity, these resources are handled by the system in terms of nominal capacity. The system does not deal with minutia such as breaking each employee down to their allocation on an hour-by-hour basis, or part-days on weekends. This 'nominal' approach was done because schedulers will have a good idea of how to handle these minutia themselves. In developing the system it was decided that client schedulers are very capable of handling such issues and that it would be a detriment to limit clients to a specific, rigid model and limitations as determined by an off-the-shelf program.

Figure 7:
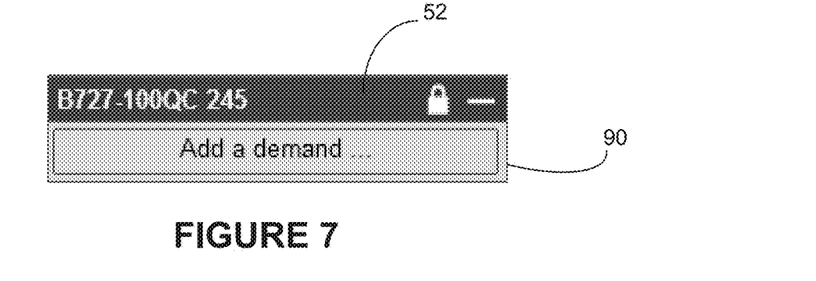
FIG. 7 shows an exemplary user interface for a newly created visit in accordance with an embodiment of the invention.
Figure 8:
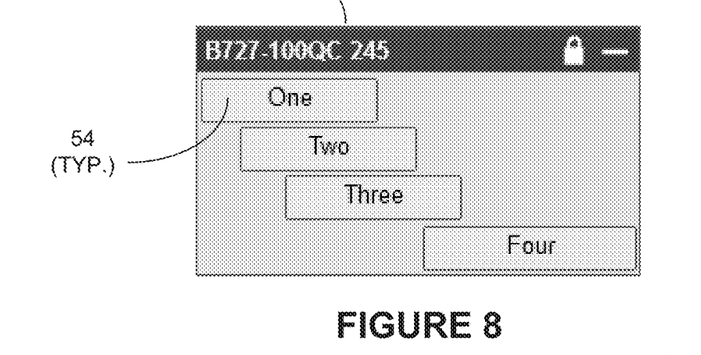
FIGS. 8 and 9 show, respectively, expanded and collapsed displays of a visit record in accordance with an embodiment of the invention.

The system also allows the user to quickly see what happens if they change certain things in the slot plan. That is, they can experiment with different 'what if scenarios' and see what the impact would be, without committing the tentative changes to the system. Thus, other users accessing the system will still see the proper, committed schedule stored on the central database, without another user's experimental changes. Usually a client scheduler will investigate possible changes if they want to know whether they can fit in a new visit, or someone is asking what would happen to the plan if the resource profile (capacity) is changed. Other exemplary 'what if' scenarios may include the following:

1. Add new visit to determine effect on labour demand
2. Add new labour capacity
3. Reschedule a current visit
4. Move a current visit from one line to another line
5. Add another line of maintenance As aircraft hangars generally have only one large door, it is often necessary to move aircraft and MRO tasks around so one aircraft does not "box in" another aircraft in the same hanger. When a visit is first created on the system, it can be moved around. You can also "lock" a visit, setting a flag which prevents the visit from being accidently moved. This is done by clicking on the "lock" icon shown in FIGS. 7 to 9, or actuating the slide shown in FIGS. 10 and 11. Such an action sets a flag in the data record for the visit, to the "locked" state. 'What if' scenarios are done in a way that is analogous to the "Apply" and "Save" approach which is commonly seen on Microsoft based personal computers (PCs). That is, the user can manipulate the schedule on his/her PC to observe the possible impact, and the changes are only updated on the main database 40 if the user clicks on the "save" button. Otherwise, the user can cancel the experimental changes and the proposed amendments will disappear.

Other systems, methods, features and advantages of the invention will be, or will become, apparent to one with skill in the art upon examination of the following figures and detailed description. It is intended that all such additional systems, methods, features and advantages be included within this description, be within the scope of the invention, and be protected by the following claims.

BRIEF DESCRIPTION OF THE DRAWINGS

These and other features of the invention will become more apparent from the following description in which reference is made to the appended drawings wherein.

DETAILED DESCRIPTION

One or more currently preferred embodiments have been described by way of example. It will be apparent to persons skilled in the art that a number of variations and modifications can be made without departing from the scope of the invention as defined in the claims.

This document describes Slot Planning in the context of an independent repair station, also known as a 3rd Party MRO (maintenance, repair and operations). Operators who do their own heavy maintenance are generally concerned about achieving maximum yield, following operational extraction rules, etc. In contrast, 3rd Party MROs want to book as much work as possible, where they have available capacity and resources. But aspects of the invention may be employed in both such environments, as well as in other operations management environments.

Figure 1:
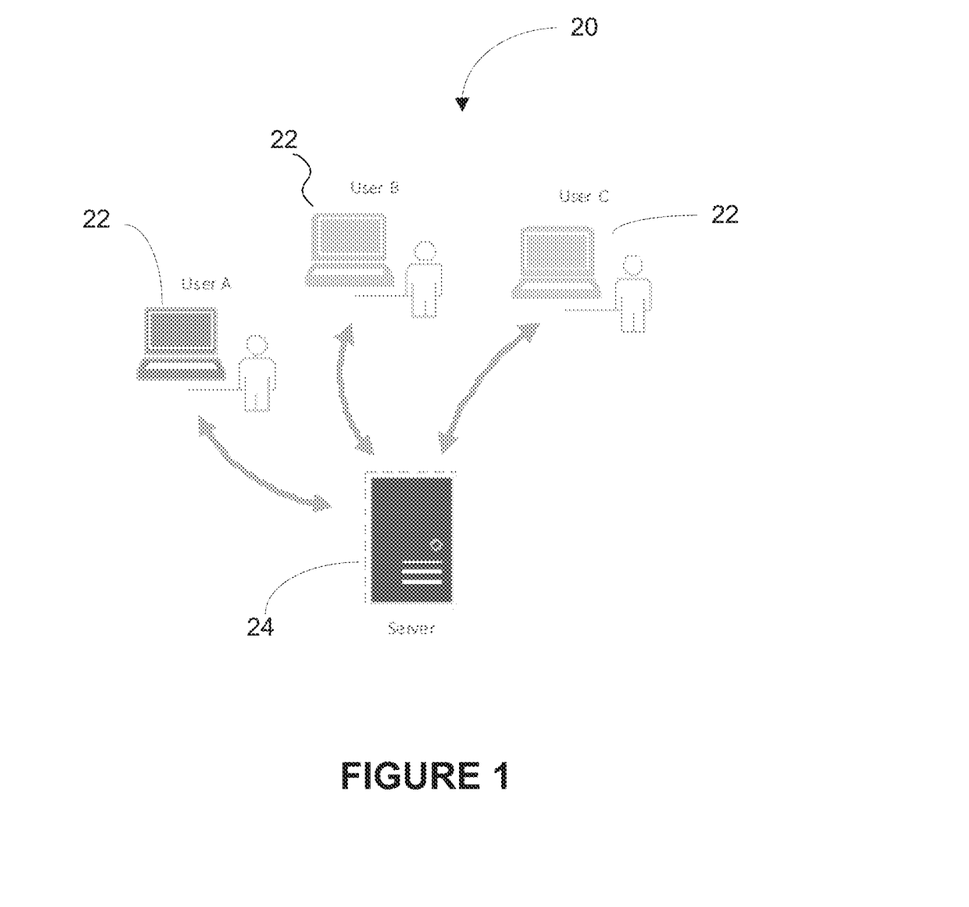
FIG. 1 shows an exemplary user network overview in accordance with an embodiment of the invention.

FIG. 1 presents an overview of an exemplary computer network 20 that could be used to implement the slot planning invention. In short, the computer network 20 can comprise any local or distributed arrangement of user computers 22 and servers 24. For example, the main software can be installed in a stand-alone installation on one or more servers, which can be accessed through a local network such as an Ethernet, over a wireless network such as a WiLan, over the Internet possibly using a VPN (virtual private network), or be deployed in the cloud. Project management and data management systems exist which provide the underlying infrastructure for distributed real-time data management systems, addressing issues such as data coherency, that is, ensuring that data on the server and clients are all the same and resolving conflicting instructions arriving from disparate sources. The invention could be implemented on such a distributed data management system.

Figure 2:
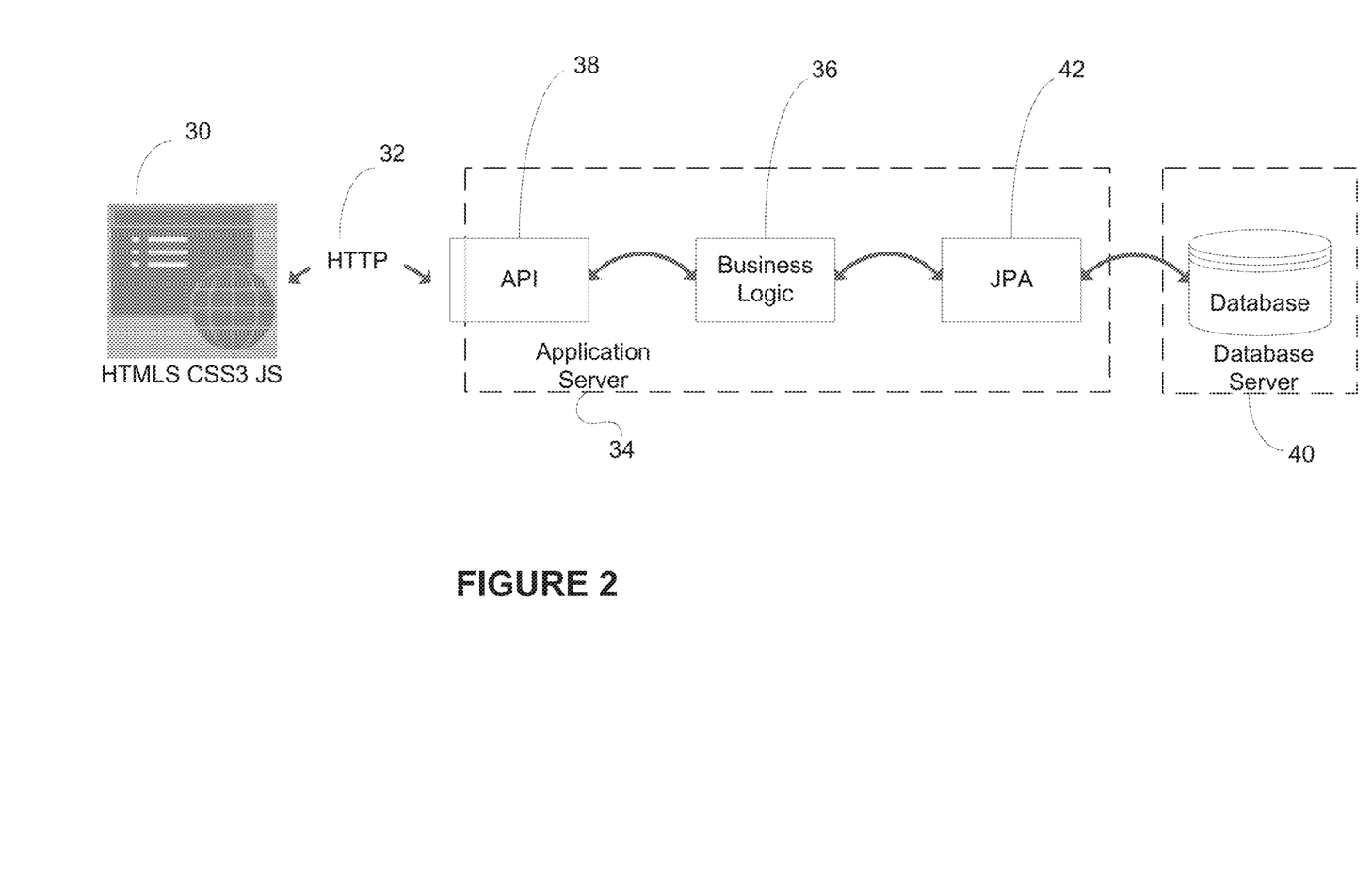
FIG. 2 shows an exemplary software architecture overview in accordance with an embodiment of the invention.

FIG. 2 presents an exemplary overview of a software architecture that could be used to implement the slot planning invention. Remote users could access the system, for example, by means of a web browser 30 via http over the Internet 32. An application server 34 could support and run the main business logic software 36, making it accessible to the user via an API 38. The application server 34 can store and access data on a separate database server 40, which may or may not be in the same physical location. The application server 34 may communicate with the database server 40 via a Java Persistence API (JPA) 42 or similar interface.

Figure 3:
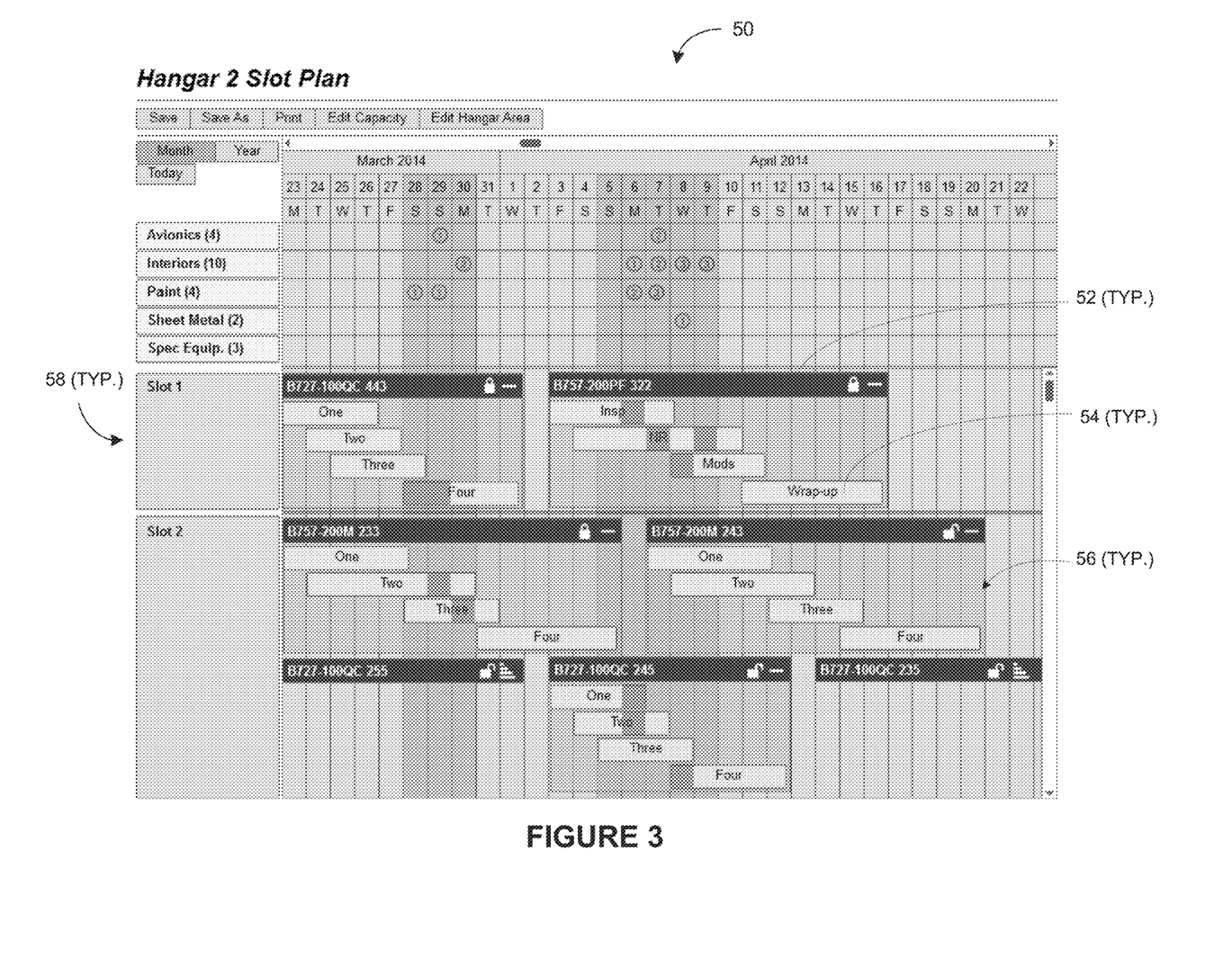
FIGS. 3 and 4 show exemplary slot planner user interfaces in accordance with an embodiment of the invention.
Figure 4:
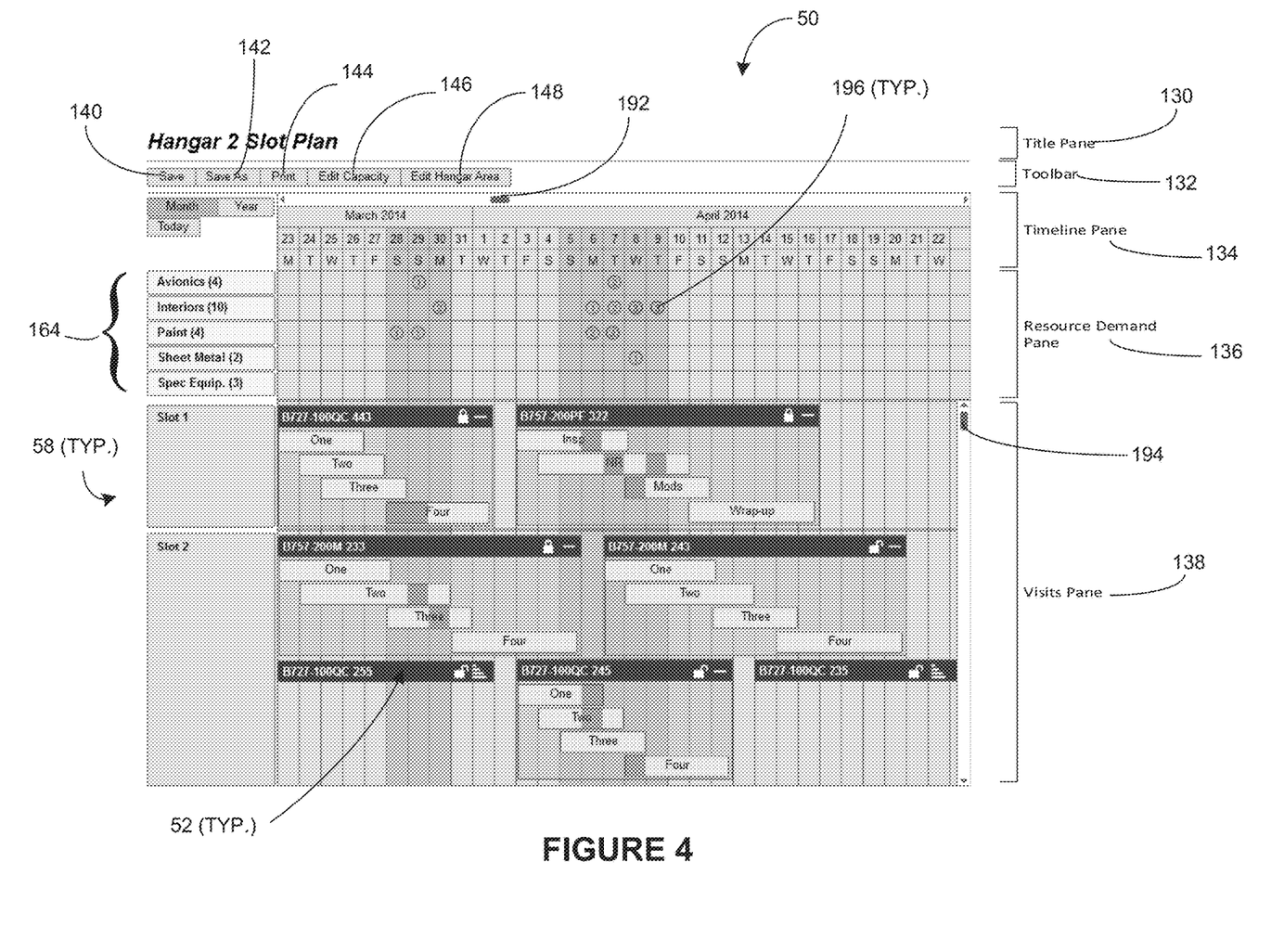

FIGS. 3 and 4 present an exemplary graphic user interface (GUI) 50 for a slot planning application.

FIG. 3 shows an arrangement of seven visits 52, that have been scheduled to be executed in two different slots 58, which are labelled as Slot 1 and Slot 2. As explained above, a 'track' or 'slot' is a defined area in an aircraft hangar, in which an aircraft can be located so that maintenance, repair and inspection tasks can be performed. A visit 52 typically contains multiple resource demand bars 54. These resource demand bars 54 represent the time required for a given resource demand generated by the visit 52. These resource demand bars 54 therefore mimic phased resource demands of a visit 52. A resource demand bar 54 is added by double-clicking in an empty area of a visit pane 56. The resource demand bars 54 can be moved within the confines of the visit 52 they belong to, simply by dragging and dropping them.

Figure 9:
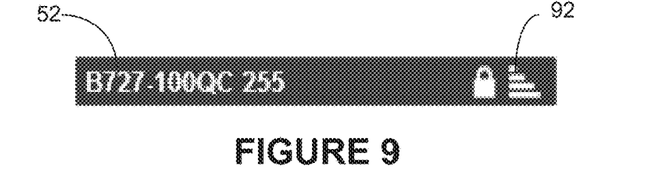

A visit 52 is added by double clicking in an empty area of a slot 58. When a new visit 52 is added, there are no resource demands yet (see FIG. 7 as an example of a display for a new visit). Clicking on the "Add a demand" tab 90 in FIG. 7 allows the user to enter new tasks. As the new tasks are added, they will appear as the resource demand bars 54 shown in FIG. 8. The titles of the tasks in FIG. 8 may be edited by clicking on the resource demand bars 54 themselves. One user may refer to the tasks as "phases" while another may use explicit labels such as "inspection", "repair", "testing", "wrap-up", etc. The user may also drag the left and right edges of each resource demand bar 54 to amend the duration. Clicking between the resource demand bars 54 in FIG. 8 will launch a new resource demand bar 54 between the resource demand bar 54 already appearing. When the visit 52 is collapsed as shown in FIG. 9, an icon 92 consisting of a number of horizontal bars, will appear in the top right corner, showing that the visit 52 includes a number of resource demand bars 54.

Once the user has a set of visits 52 initially and provisionally planned, the user will understand that within a given time frame, there are potential resource shortfalls driven by having too many visits 52 overlapping. The user may then move visits 52 around to alleviate the problematic time windows, or may plan to hire temporary workers for certain time periods. Visits 52 are moved simply by dragging and dropping them. Each of the visits 52 is stored as a row in a table in a relational database system. Additional tables or rows are maintained for each of the phases in a given visit. Standard tools and functions are available for windows-type interfaces which extract the data from such dragging and dropping, so that it can be used in local calculations and/or save on the system.

Visits 52 can appear in FIGS. 3 and 4 in either expanded or collapsed form. In the expanded form all of the resource demand bars 54 appear for a given visit, while in collapsed form none of the resource demand bars 54 associated with the visit will appear. For example, visit B727-100QC 255 is shown in FIGS. 3 and 4 in collapsed form, while visit B727-100QC 245 is shown in expanded form. Each resource demand bar 54 has a label, assigned resource types and demand values for each of the assigned resource types. For example, the visit B727-100QC 245 in FIG. 4 comprises four resource demand time windows. Phase 1 may have Inspector demand at 2, Phase 2 may have Engineers at 1 and Mechanics at 10, and so on.

Figure 10:
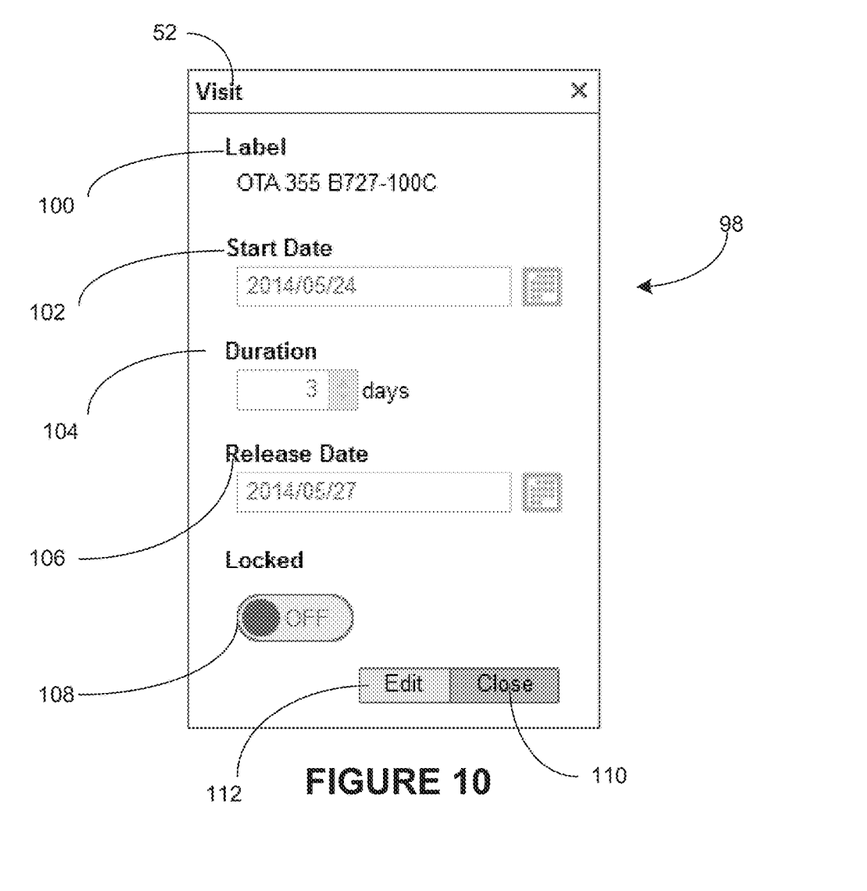
FIG. 10 shows an exemplary user interface for displaying visit details in accordance with an embodiment of the invention.
Figure 11:
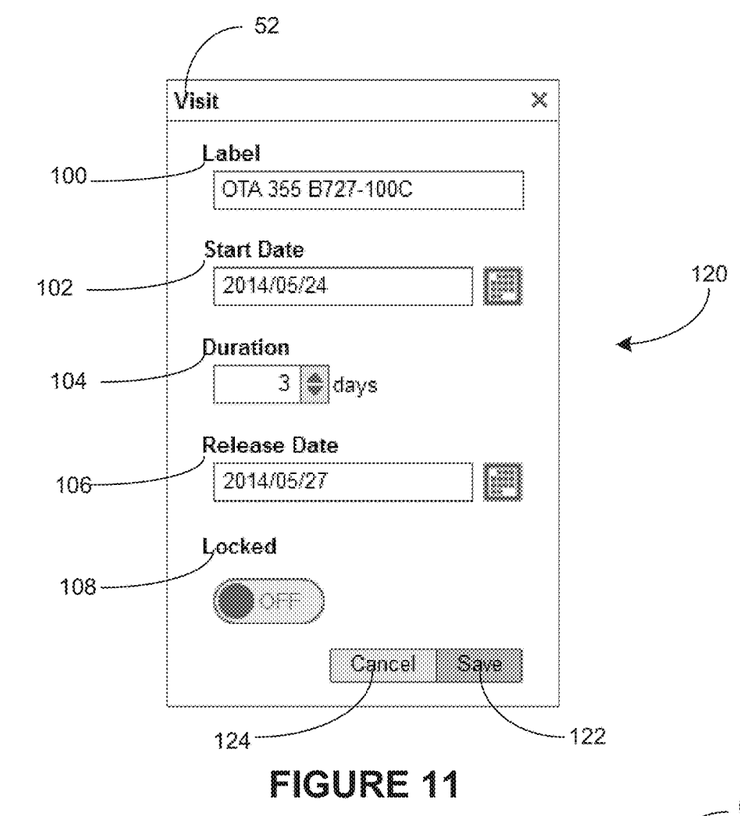
FIG. 11 shows the exemplary user interface of FIG. 10, in edit mode, in accordance with an embodiment of the invention.

The details of a visit 52 may be viewed via a single click on the middle area of the visit bar. FIG. 10 presents an exemplary display window 98 showing the details of a visit 52. As shown, this window 98 may include a label 100 for the given visit 52, the current start date 102, the duration 104, the release date (that is, the expected date at which the visit 52 will be completed) 106 and the lock status 108 (i.e. whether this visit is in a locked or unlocked state). The user may simply review the data in FIG. 10, and then close the interface 98 by clicking on the "close" tab 110. Upon clicking on the "Edit" button 112 of FIG. 10, the window 98 enters the edit mode 120 shown in FIG. 11. All of the fields in FIG. 11 are the same as those of FIG. 10, except that their entries can be changed while in the editing mode 120 simply by clicking on the field, or by using other standard window functionality such as clicking on up/down arrows or using an interactive pop-up calendar. Note that updating the value in the duration field 104 in FIG. 11 will recalculate the release date 106, and conversely, updating the release date 106 in FIG. 11 will recalculate the duration value 104. These calculations can be effected with simple code within the GUI. Once the edits have been completed they can either by saved by clicking on the "save" tab 122, or cancelled by clicking on the "cancel" tab 124. Note that clicking on the "save" tab 122 of FIG. 11 does not save the data back to the main database 40, but merely saves the changes locally. It is only when changes are saved from the interface of FIGS. 3 and 4 that the changes are sent back to the main database 40.

Figure 12:
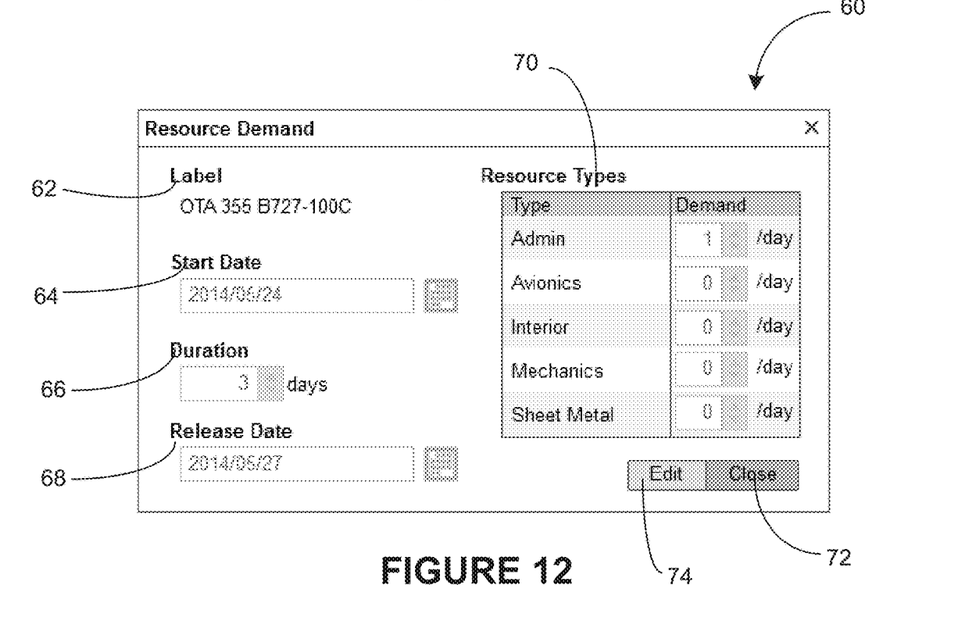
FIG. 12 shows an exemplary user interface for displaying resource demand details in accordance with an embodiment of the invention.
Figure 13:
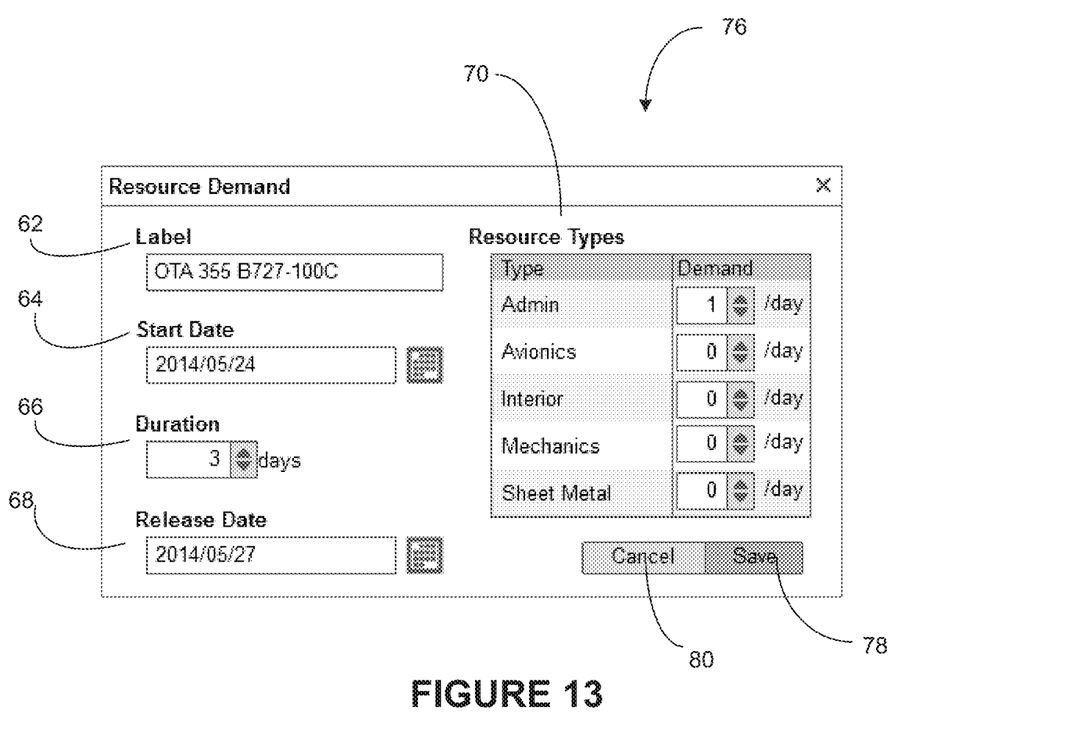
FIG. 13 shows the exemplary user interface of FIG. 12, in edit mode, in accordance with an embodiment of the invention.

Similarly, the details of a resource demand bar 54 may be viewed via a single click on the middle area of a given resource demand bar 54. This action launches the resource demand user interface 60 of FIG. 12, which shows the label 62 for the given resource demand bar 54, the current start date 64, the duration 66, the release date (that is, the expected date at which the task will be completed) 68 and the resources 70 that the task will consume. The user may simply review the data in FIG. 12, and then close the resource demand user interface 60 by clicking on the "close" tab 72. Upon clicking on the "Edit" button 72 of FIG. 12, the window enters the edit mode 76 shown in FIG. 13. All of the fields in FIG. 13 are the same as those of FIG. 12, except that their entries can be changed while in the editing mode 76. Like the visit interface described above, values in FIG. 13 can be amended by clicking on the field, or by using other standard window functionality such as clicking on up/down arrows or using an interactive pop-up calendar. Note that updating the value in the duration field 66 in FIG. 13 will recalculate the release date 68. Conversely, updating the release date 68 in FIG. 13 will recalculate the duration value 66. These calculations can be effected with simple code within the GUI. Once the edits have been completed they can either by saved by clicking on the "save" tab 78, or cancelled by clicking on the "cancel" tab 80. Note that clicking on the "save" tab 78 of FIG. 13 does not save the data back to the main database 40, but merely saves the changes locally. It is only when changes are saved from the interface of FIGS. 3 and 4 that the changes are sent back to the main database 40.

The title pane 130 of FIG. 4 is a text area that is not allowed to grow in size as a function of the number of characters. If there are too many characters to display, the font size auto-shrinks and wraps within the designated title pane area. The title pane area 130 is used to describe the nature of the current slot plan. As shown in the example of FIG. 4, this exemplary slot plan is for Hangar 2.

The toolbar area 132 of FIG. 4 contains the user action buttons that affect the plan itself. The 'save' 140, 'save as' 142 and 'print' 144 commands are self-explanatory and would be implemented as known in the art. Standard tools and functions are available for windows-type interfaces to database management systems which allow the user to drag and drop elements, and manipulate edges. When the user makes such changes and "saves" or "accepts" them, the corresponding records in the main database 40 are updated accordingly.

Figure 5:
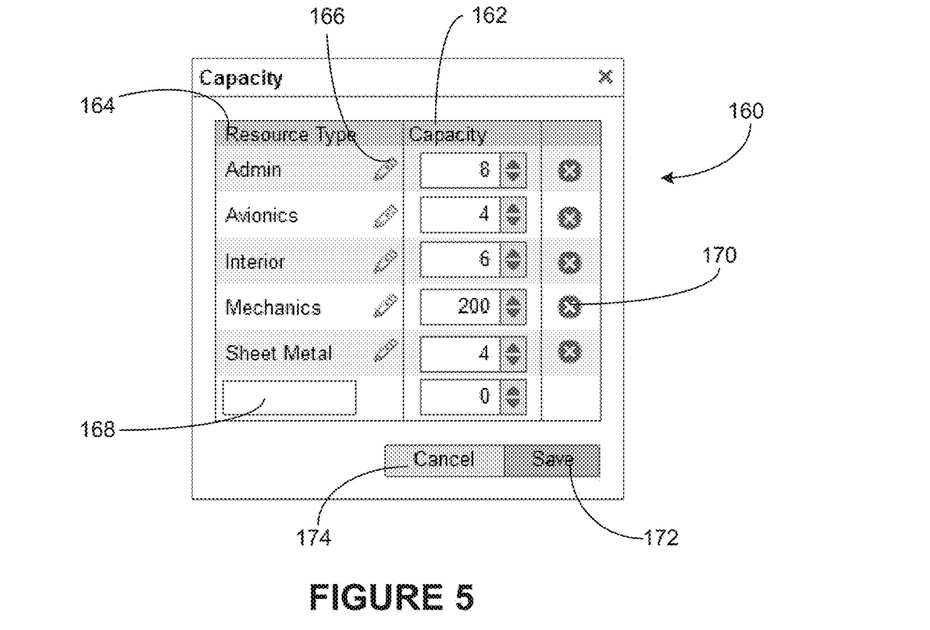
FIG. 5 shows an exemplary 'edit capacity' user interface in accordance with an embodiment of the invention.

The 'Edit Capacity' 146 function enables the user to change the nominal capacity of resources for the current slot plan. Clicking on this 'Edit Capacity' 146 function causes the edit capacity interface 160 of FIG. 5 to launch. The user is able to change the nominal capacity 162 for a given resource type 164 by entering a new number in the capacity field, or by clicking on the up/down arrows. The name of the resource type 164 may be edited by clicking on the pencil icon 166 associated with the resource type 164. The user is able to add a new resource type by clicking on the empty box 168, and entering text which describes the new resource type. The user may also delete existing resource types 164 from the plan by clicking on the "X" symbol 170 associated with a given resource type. The user is prompted for confirmation when deleting a resource type that is assigned to a resource demand bar 54. Once the user has completed their edits, they can be saved by clicking on the "Save" tab 172, or they can be abandoned by clicking on the "Cancel" tab 174. Note that the "save" tab 172 on the edit capacity interface 160 only effects a local save. Changes to the data and the resulting calculations will only be effected on the main database 40 if the "save" 140 or "save as" 142 are affected on the main slot plan GUI 50.

Figure 6:
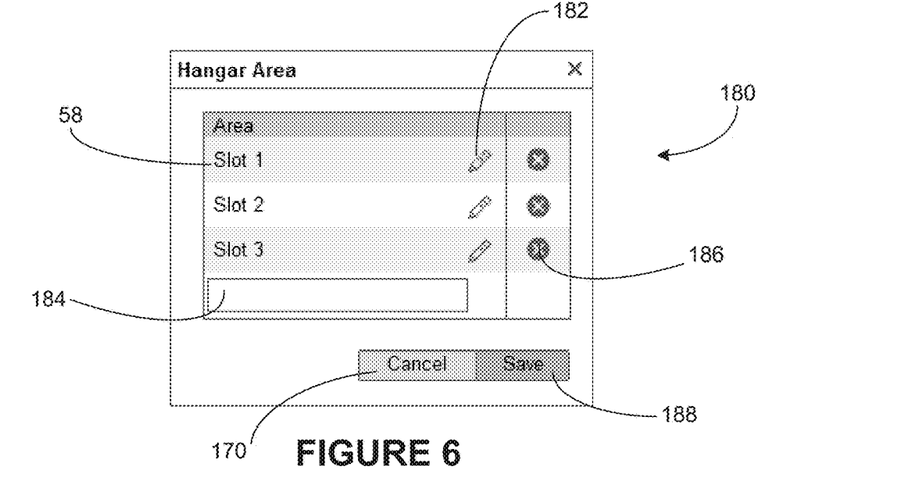
FIG. 6 shows an exemplary 'edit work areas' user interface in accordance with an embodiment of the invention.

The 'Edit Hangar Area' tab 148 in FIG. 4 enables the user to change the hangar areas by launching the hangar area interface 180 of FIG. 6. The user is able to add a new hangar area (i.e. a "slot" or "track") 58 in this hangar area interface

180, and/or delete existing ones from the plan. As explained above, slots or "tracks" are physical areas in a hangar, in which an aircraft can be positioned for inspection, maintenance or repair. By clicking on the pencil icon 182 the user can amend the title of a slot to suit whatever identification system the user wishes to have: compass position (N, S, W, E), zone number or letter, project manager name, etc. If, for example, a certain customer uses a given location all the time they may use an explicit heading such as "Southwest-narrow". The user is able to add a new slot 58 by clicking on the empty box 184, and entering text which describes the new slot. The user may delete existing slots 58 from the plan by clicking on the "X" symbol 186 associated with a given slot 58. The user is prompted for confirmation when deleting a hangar area/slot 58 that has a visit 52 scheduled. Once the user has completed their edits, they can be saved locally by clicking on the "Save" tab 188, or they can be abandoned by clicking on the "Cancel" tab 190.

The 'timeline pane' 134 of FIG. 4 includes a timeline display that can be shown in Month view or year view. Month view is selected by default. The timeline shows three rows in Month view: Month of Year, day of the month, and day of the week. In year view, the timeline will show three rows in view: Year, Month, week of the year. Scrolling through the timeline will scroll both the Resource Demand pane and the Visits pane. Days or weeks where the total resource demand is higher than the nominal capacity for any of the resource types are highlighted. Scrolling with the mouse wheel 192 in this pane 134 will scroll the timeline left and right.

The 'resource demand' pane 136 of FIG. 4 is used to indicate to the user where the total demand for a given resource across the slot plan exceeds the nominal capacity set for the hangar. The left hand side of the 'resource demand' pane presents a list of resource types 164 defined in the system. It is sorted by a custom order value assigned to each resource type. For example, Avionics may be assigned a value of 2 and Electrician may be assigned a value of 1, in which case Electrician will be displayed above Avionics. Each resource type 164 is assigned a nominal capacity via the edit capacity interface 160 of FIG. 5. The total nominal capacity for each resource type 164 is displayed as part of the label in brackets, these nominal capacity values being obtained via a simple call to the main database 40. The user may edit the label and nominal capacity values by clicking on the "edit capacity" tab 146, which opens the interface of FIG. 5.

The intersection of the resource type 164 and a day/week in the 'resource demand' pane 136 is where the comparison of nominal capacity and total demand is calculated. If the total demand is greater than the nominal capacity, then the degree of over capacity is displayed 196 to indicate that there is a resource shortfall. The resource demand indication 196 may consist of a number representing the degree or extent of the resource shortfall. The shortfall values are preferably colour-coded for severity, drawing the user's attention to them. The vertical date/week line is highlighted across timeline, resource type, and visit pane. Also the date cells of the phases of the visit that is involved in the demand peaks are also highlighted. In the case of FIG. 4, the dates of March 28 to 30 and April 5 to 9 are shown as highlighted, with numbers entered in the 'resource demand' pane 136 indicating the level of the shortfall in terms of the numbers of the resources which are over-committed.

The 'visits' pane 138 of FIG. 4 presents all of the currently quoted and committed visits 52, sorted by hangar area or slot 58. A slot 58 can contain multiple visits 52 and visits may overlap in the time dimension. Scrolling with the mouse wheel 194 in the 'visits' pane 138 will scroll the contents of the pane up and down so that other slots 58 may be viewed.

Note that the visit 52 in the 'visits' pane 138 of FIG. 4 can be edited interactively, for example, as follows:

a) dragging the start date side of a resource demand bar 54 to edit the start date;

b) dragging the end date side of a resource demand bar 54 to edit the end date;

c) dragging the resource demand bar 54 itself inside the same work area to slide the whole visit 52; or d) dragging the resource demand bar 54 itself to another work area.

As the user moves the visits 52 around, the user interface 50 updates the over capacity resource demand indicators 196 in the resource demand pane 136 in real time. This may be done via database updates/calls and simple calculations, but it is preferred that the calculation of the over capacity resource demand indicators 196 be done by code on the GUI. Performing the calculations on the GUI would be faster than having the calculations done by the database management system. But it is also less complicated to have the calculations done by code on the GUI. Performing the calculations on the database management system would require 'what if' scenarios to be sent to the database management system itself rather than keeping them local (i.e. on the user's personal computer only).

Figure 14:
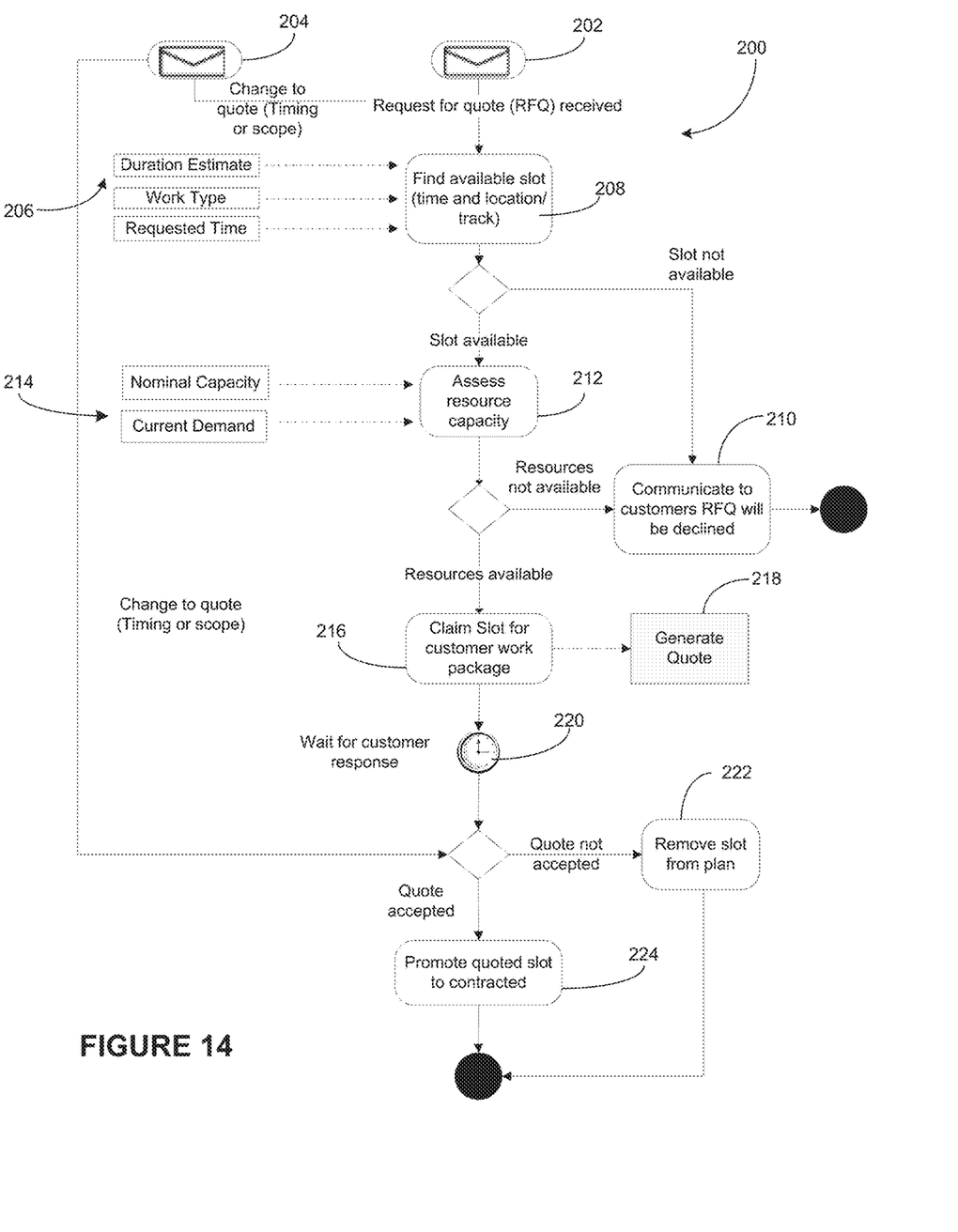
FIGS. 14 and 15 show exemplary process flow diagrams in accordance with embodiments of the invention.
Figure 15:
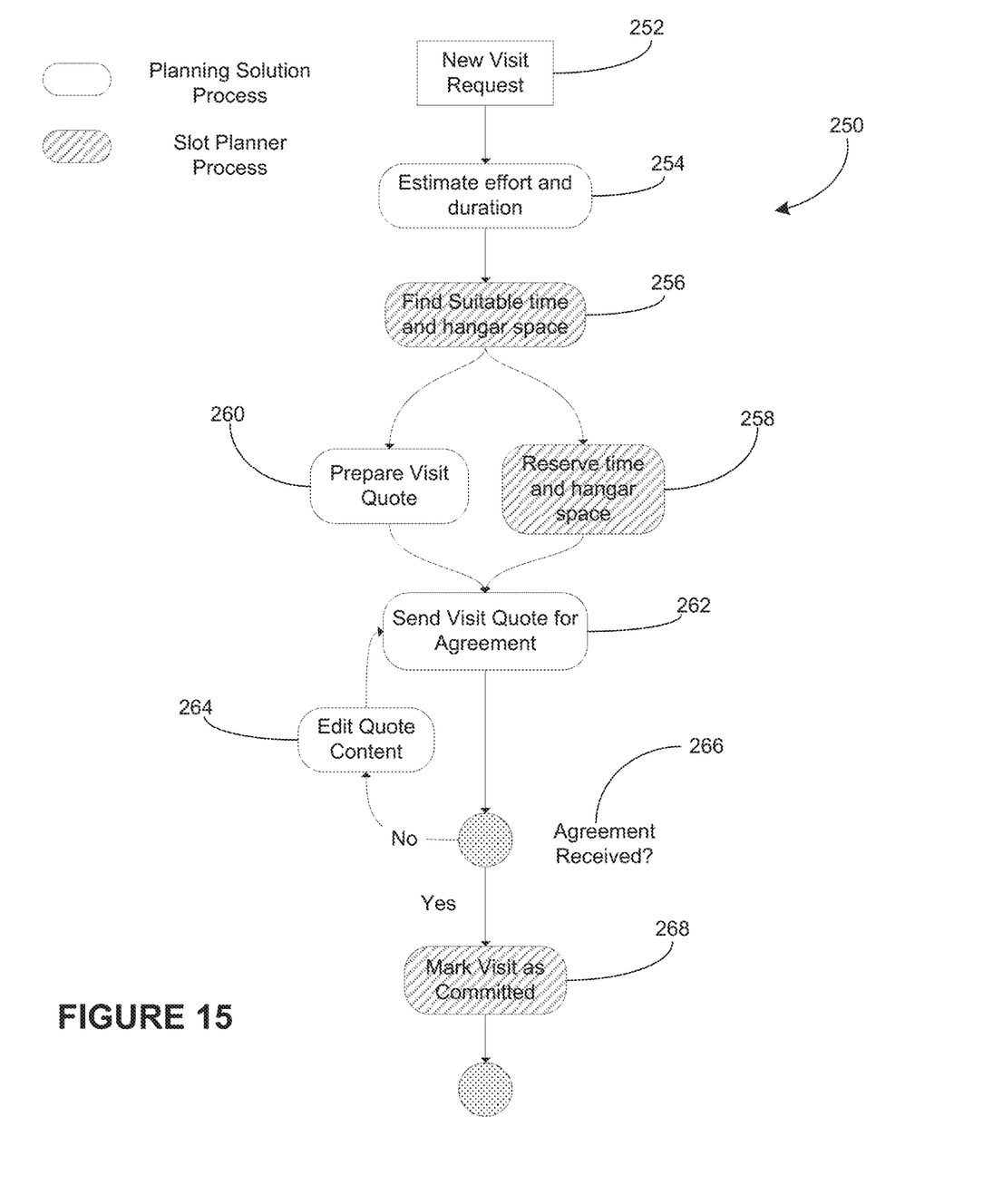

FIGS. 14 and 15 present exemplary process flow diagrams for implementing the slot planning system described above. These high level workflows and design specifications are sufficient for a developer to apply the concepts of the invention to any particular platform and/or existing MRO or LRP system.

FIG. 14 presents a process flow diagram 200 for a scenario in which a Request for Quote is being received and addressed. Referring to FIG. 14, a user will typically receive a Request for Quote 202 and possible changes or amendments 204 via email, online postings or in some other manner. The user determines the estimated duration for the project, the work type, the aircraft type, the requested completion date and other relevant aspects of the project 206 and uses this information to find a slot in the work plan 208 to accommodate the new work. He/she then drags the work type into the slot 58 that he/she wants. If it is determined that no suitable slot 58 exists, the user may advise the customer that the RFQ will be declined 210. If a suitable slot 58 does exist then the user may assess the resource capacity 212 and optimize the use of the resources by considering the nominal capacity and currently committed demand 214 and:

a) creating an appropriately sized visit in the slot selected 216;

b) increasing or decreasing the duration of the visit as required to ensure that the resource consumption does not exceed the nominal amounts; and c) adjusting the start date or end date to ensure that the resource consumption for all of the visits on the system, does not exceed the nominal amounts.

Of course, the user may also move around other unlocked visits to free up the resources needed for the new project.

When the user sets up the new slot claim 216, the slot will be "saved" as a proposed visit, having the title read "quoted" or "approval pending" to show that the visit is not yet confirmed to go ahead. The user may also "lock" the quoted visit to ensure that it is not accidently erased or disregarded by others. The user may then send a quote to the customer 218 without being concerned that the resources will be committed elsewhere.

The user will then typically have to wait until the customer advises who has been awarded with the contract 220. If the quote is not accepted, then the quoted visit may be deleted from the plan 222. If the quote is accepted 224, then the user:

a) finds the quoted visit in the slot plan;

b) switches the status in the quoted visit title from "quoted" or "approval pending", to "committed", "contracted" or something similar. This change is then saved on the main database 40; and c) switches the status of the now committed visit to a "locked" state, saving that change on the main database 40 as well.

There is no explicit quoted/contracted button on the system, but such a button could be provided to automate the tasks of locking the visit, and updating the visit title to a term like 'Contracted' or 'Quoted'. It was felt that this task should not be implemented in this way as it provides users with less flexibility.

FIG. 15 presents a process flow diagram 250 for the handling of a generic request for a MRO visit. The processes shown in clear boxes are processes that would typically occur, while the processes shown in the boxes with crosshatches refer to processes that are particular to those of the current invention.

Referring to FIG. 15, a user will typically receive a new visit request 252 containing the aircraft information, a list of work, and a time period between which the aircraft is available for maintenance. The user then estimates the effort, material, and duration, considers the established work standards and consults with their parts store on the availability of the parts required to satisfy the contract 254. Based on these estimates, the user then finds a suitable time and space within the facility 256, using the slot planning application described above. This is done by using the slot planning application to consider current visits, confirmed visits and resource capacity planning. The possibility of double booking is reduced by reserving the facility area 258 at the same time as the quotation is prepared 260. When the quotation is sent 262, the user can be assured that the necessary resources are reserved as required.

In some cases the user and customer may agree to additional change or amendments 264, before a contract is awarded. If the user receives the contract/agreement with the customer 266 he will mark the visit as being committed 268. This is done simply by amending the title of the visit to "committed", "locking" the visit, and saving these changes on the main database 40.

CONCLUSIONS

The present invention has been described with regard to one or more embodiments. However, it will be apparent to persons skilled in the art that a number of variations and modifications can be made without departing from the scope of the invention as defined in the claims.

The method steps of the invention may be embodied in sets of executable machine code stored in a variety of formats such as object code or source code. Such code may be described generically as programming code, software, or a computer program for simplification. Clearly, the executable machine code or portions of the code may be integrated with the code of other programs, implemented as subroutines, plug-ins, add-ons, software agents, by external program calls, in firmware or by other techniques as known in the art.

The embodiments of the invention may be executed by a computer processor or similar device programmed in the manner of method steps, or may be executed by an electronic system which is provided with means for executing these steps. Similarly, an electronic memory medium such computer diskettes, hard drives, thumb drives, CD-Roms, Random Access Memory (RAM), Read Only Memory (ROM) or similar computer software storage media known in the art, may be programmed to execute such method steps. As well, electronic signals representing these method steps may also be transmitted via a communication network.

All citations are hereby incorporated by reference.

What is claimed is:

1. A resource management system comprising:
a main server;
multiple remote computers, each of the multiple remote computers comprising a respective display; and
a communications system configured to allow said multiple remote computers to access said main server;
wherein said main server is operable to:
    maintain a distributed operations support system at least in part by maintaining a committed schedule and data coherency between the main server and each of the multiple remote computers with respect to the committed schedule;
    record resources required for each of multiple future visits scheduled on said distributed operations support system, wherein each of said multiple future visits is mapped to a set of quantified resource requirements;
    maintain a nominal capacity value for each of the resources; and
    in real-time:
        present each of said multiple future visits graphically on a timeline based on a schedule for each of said multiple future visits;
        tabulate a total level of resources required collectively for all of said multiple future visits for each time period in a timeline and cause the tabulated total levels of resources to be presented on the timeline;
        determine resources for which there is a shortfall at least in part by comparing the nominal capacity value for each of the resources to tabulated levels of resources required for all of said multiple future visits over a defined time period; and
        cause over-capacity resource demand indicators to be presented within the timeline on the respective display of each said multiple remote computers, said over-capacity resource demand indictors identifying resources for which there is a shortfall;
wherein each of said multiple remote computers is operable to, via a user interface provided by the main server:
    locally effect an experimental or tentative change to the distributed operations support system without committing the experimental or tentative change to the committed schedule;
    locally update said over-capacity resource demand indicators within the timeline and in real time;
    commit the experimental or tentative change by sending instructions to the main server that cause the main server to update the committed schedule accordingly; and
    display a lock icon that is operable to place a committed change into a locked state, thereby preventing the committed change from being erased or removed.

2. The system of claim 1 wherein the distributed operations support system is for the maintenance of aircraft.

3. The system of claim 1, wherein said over-capacity resource demand indicators are presented using a colour-coding system.

4. The system of claim 1, wherein said over-capacity resource demand indicators comprise a numeric difference between the nominal capacity value for one or more of the resources and a corresponding tabulated level of the one or more resources.

5. The system of claim 1 further comprising a central database operable to store said committed schedule.

6. The system of claim 1, wherein the user interface enables a user to adjust resource requirements for said future visits.

7. The system of claim 1, wherein the user interface enables a user to drag and drop at least one of said future visits to different points in the timeline.

8. The system of claim 7, wherein the user interface is configured to update said over-capacity resource demand indicators in real time in response to a user dragging and dropping at least one of said future visits to a different point in said timeline.

9. The system of claim 1 wherein:
the main server is operable to distinguish between committed and non-committed future visits; and
the tabulation of the total level of resources required includes both committed and non-committed future visits on a day-by-day basis.

10. The system of claim 1 wherein the main server is operable to organize said future visits by slot space in an aircraft hangar, each slot space being able to include future visits across the complete timeline.

11. The system of claim 1 wherein each of said resource requirements comprises a quantified value.

12. A method of resource management, comprising:
maintaining a distributed operations support system including maintaining a committed schedule and data coherency between a main server and multiple remote computers with respect to the committed schedule, each of the multiple remote computers comprising a respective display and including a display of multiple future visits scheduled on the distributed operations support system across a timeline;
causing a record of resources required for each of said multiple future visits to be recorded on said distributed operations support system, wherein each of said multiple future visits is mapped to a set of quantified resource requirements;
maintaining a nominal capacity value for each of the resources;
in real time:
tabulating a total level of resources required for all of said multiple future visits for each time period in a timeline and causing the tabulated total levels of resources to be presented on the timeline;
determining resources for which there is a short-fall at least in part by comparing the nominal capacity value for each of the resources to the tabulated levels of said resources required for all of said multiple future visits, on a day-by-day basis; and
causing over-capacity resource demand indicators to be presented within the timeline on the respective display of at least one of said multiple remote computers, said over-capacity resource demand indicators identifying one or more resources for which there is a shortfall; and
providing a user interface to the multiple remote computers, wherein the interface is configured to enable each of the multiple remote computers to:
display the timeline on the respective display;
locally effect an experimental or tentative change to the distributed operations support system within the timeline on the respective display and without committing the experimental or tentative change to the committed schedule;
locally update said over-capacity resource demand indicators in real time and within the timeline on the respective display;
commit an experimental or tentative change by causing transmission of instructions to the main server that cause the main server to update the committed schedule; and
cause a lock icon to be presented on the display, wherein the lock icon is operable to place a committed change into a locked state, thereby preventing the committed change from being erased or removed.

13. The method of claim 12 wherein, each of said resource requirements comprises a quantified value.

14. The method of claim 12, wherein said distributed operations support system is for the maintenance of aircraft.

15. The method of claim 12, wherein said over-capacity resource demand indicators are presented using a colour-coding system.

16. The method of claim 12, wherein said over-capacity resource demand indicators comprise a numeric difference between the nominal capacity value for one or more of the resources and a corresponding tabulated level of the one or more resources.

17. The method of claim 12, wherein said causing a record of resources required for each of said multiple future visits to be recorded comprises storing committed data on a central database.

18. The method of claim 12, wherein said user interface enables a user to adjust resource requirements for one or more of said future visits.

19. The method of claim 12, wherein said user interface enables a user to drag and drop at least one of said future visits to different points in the timeline.

20. The method of claim 19, further comprising updating said over-capacity resource demand indicators in real time in response to a user dragging and dropping at least one of said future visits to a different point in said timeline.

21. The method of claim 12, wherein:
the future visits comprise both committed and non-committed visits;
the tabulation of the level of resources required includes both committed and non-committed future visits; and
the user interface is further configured to indicate whether a given one of said future visits is a committed or non-committed future visit.

22. The method of claim 12, further comprising, with the main server, organizing the multiple future visits by slot space in a hangar, wherein said user interface is further configured to present each slot space within said timeline.

* * * * *